United States Patent [19]

Guaita et al.

[11] Patent Number: 5,140,095

[45] Date of Patent: Aug. 18, 1992

[54] BIODEGRADABLE POLYAMIDE, FILMS AND PRODUCTS OBTAINED FROM SAID POLYAMIDE AND PROCESS FOR ITS PREPARATION

[75] Inventors: Cesare Guaita, Tradate; Gianluigi Semeghini, Cantu, both of Italy

[73] Assignee: SNIA Tecnopolimeri S.p.A., Italy

[21] Appl. No.: 634,163

[22] PCT Filed: Jun. 10, 1989

[86] PCT No.: PCT/EP89/00654

§ 371 Date: Jan. 31, 1991

§ 102(e) Date: Jan. 31, 1991

[87] PCT Pub. No.: WO89/12656

PCT Pub. Date: Dec. 28, 1989

[30] Foreign Application Priority Data

Jun. 20, 1988 [EP] European Pat. Off. ........ 21046A/88

[51] Int. Cl.$^5$ ............................................. C08G 69/02
[52] U.S. Cl. .................................... 528/220; 528/229; 528/272; 528/288; 528/302; 528/324; 528/332; 528/335; 428/364

[58] Field of Search ............... 528/220, 229, 272, 288, 528/302, 324, 332, 335; 428/364

[56] References Cited

U.S. PATENT DOCUMENTS

| | | | |
|---|---|---|---|
| 3,860,538 | 1/1975 | Guillet et al. | 521/139 |
| 3,878,169 | 4/1975 | Guillet et al. | 528/220 |
| 3,989,678 | 11/1976 | Furukawa et al. | 528/324 |
| 4,042,568 | 8/1977 | Guillet et al. | 528/229 |
| 4,145,516 | 3/1979 | Guillet et al. | 528/85 |
| 4,950,735 | 8/1990 | Vanderbilt et al. | 528/354 |

*Primary Examiner*—Samuel A. Acquah
*Attorney, Agent, or Firm*—Wolf, Greenfield & Sacks

[57] ABSTRACT

This invention relates to a biodegradable polyamide. In particular, this invention relates to a polyamide containing keto carbonyl groups set out in monomeric units along the main chain of the polymer and having structure (I), wherein n and m are equal or different whole numbers ranging from 8 to 10, preferably 8. Said polyamides are high light-sensitive to the solar U.V. radiation, so that the exposure of the products obtained by means of such polyamides to the U.V. solar radiation causes the product to be transformed into a fragile or friable material, that is biodegradable.

18 Claims, No Drawings

BIODEGRADABLE POLYAMIDE, FILMS AND PRODUCTS OBTAINED FROM SAID POLYAMIDE AND PROCESS FOR ITS PREPARATION

This invention relates to a biodegradable polyamide containing keto carbonyl groups, to the process for its preparation as well as to films and other products obtained from said polyamide.

The polyamides according to this invention are meant to be both aliphatic and aromatic polyamides and copolyamides, preferably nylon 6 and 6,6.

In particular, the scope of this invention relates to copolymers being sensitive to the solar U.V. radiation, which involves their transformation into a fragile or friable product, so to prevent the pollution caused by the permanence of products such as bags for example, that have an extremely long life and, consequently, cause a deterioration of the environment in which they are left.

The pollution caused by bags made of plastic material and, in particular, of polyamide material, is well-known, and methods have been suggested in order to solve this problem. For example, it is possible to mix fillers, in the polymer mass, in order to make it biodegradable; such fillers can be, for example, cellulose, flour, etc. However, in practice, it occurred that the product so obtained, especially as film, has an opaque appearance and is not perfectly transparent, and beside this the same mechanical properties of said polymer decrease dramatically, even when the polymer is not exposed to sunlight.

Moreover, the Canadian Patent N· 975491 claims a photodegradable polyamide composition, containing keto carbonyl groups located in a side chain at a position immediately adjacent to the main polymeric chain; said polymeric chain having monomeric units of the structure (II)

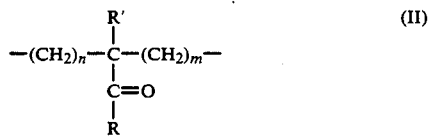

wherein m and n are whole numbers from 1 to 6, R is an alkyl, aryl or alkenyl groups having 1 to 12 carbon atoms and R' is H or an alkyl groups having 1 to 6 carbon atoms.

In practice, however, it occurred that these polyamides, made virtually only on a laboratory scale, are extremely difficult to synthesize through the usual industrial processes applicable to polyamides, as they require high (200°-300° C.) reaction temperatures in the absence of solvents and thus said known polyamides tend to degrade easily under such industrial conditions.

Furthermore, said known polyamides are less sensitive to the solar U.V. radiation so that their photodegradation takes place quite slowly.

Therefore, one of the objects of this invention is to make a polyamide being highly sensitive to solar U.V. radiation and having, at the same time, high mechanical and structural properties.

Another object of this invention is a process to obtain a biodegradable polyamide that is sensitive to solar U.V. radiation and, therefore, is transformable into a fragile or friable product, without requiring very long exposures.

A further object of the invention is to obtain a polyamide being photodegradable to the exposure of solar U.V. light, that is also biodegradable, or in other words that it is able to be attacked by the bacteria existing in nature in order to obtain the complete degradation even of the smallest particles resulting from the photodegradation. This is particularly important, as the mere photodegradation determines fragility or friability and, consequently, the decay of the product, such as the film for example, into very small pieces, which, if they would not be able to be biologically attached by bacteria, they would in any case cause pollution.

These and other objects of the invention are achieved by the polyamide according to the invention which is characterized in that it contains keto carbonyl groups set out along the main polymer chain, in monomeric units having the structure (i)

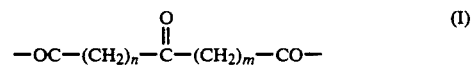

wherein n and m are equal or different whole numbers ranging from 8 to 10, said keto carbonyl groups being enough to cause an accelerated photodegradation of said polyamide, so to produce, after the exposure to the solar U.V. radiation, a fragile or friable and biodegradable product, while keeping high mechanical properties before said exposure to the sunlight.

Preferably n and m are equal to 8.

Moreover, the polyamide according to the invention contains preferably the monomeric units of formula (I) in an amount from 0.2 to 10, and more preferably in an amount from 0.5 to 3 percent by weight based on the total polymer. By the term polymer in the present invention there is meant also copolymer.

Preferably the polyamide according to the invention is nylon-6 or −6.6.

In particular, as far as nylon-6,6 is concerned, the process for its preparation consists in the polymerization of hexamethylenediamine with adipic acid and with at least one dicarboxylic acid having the structure (III)

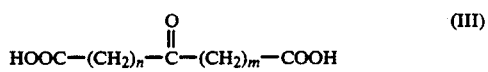

wherein m and n are equal or different whole numbers ranging from 8 to 10, preferably 8. As far as nylon 6 is concerned, the process for its preparation consists in the polymerization of caprolactam and/or ε-aminocaproic acid with at least one dicarboxylic acid having the above structure (III) with hexamethylenediamine (HMDE) in an equal molar amount to said dicarboxylic acid having the structure (III).

The preparation of said dicarboxylic acid having the structure (III) can be made, for example, through a well-known method which is not part of this invention, and which is illustrated, for example, in "Organic Syntheses Volume 38, pages 38-40". In particular, the keto-nonadecanedioic acid, for example, can be prepared according to the following diagram:

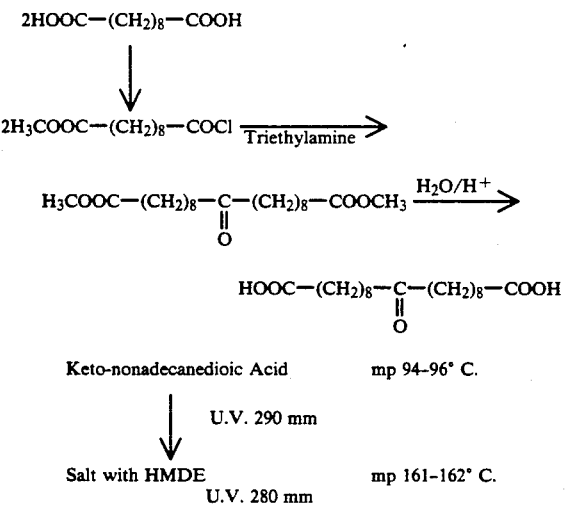

The invention relates also to mono-oriented and bi-oriented films produced by using the polyamide according to the invention, or by using the process of the invention. Moreover, the invention relates to the other manufactured products obtained from said polyamide.

It is specified that films of omega polyamides and copolyamides (both aliphatic and aromatic) of monomers containing a keto carbonyl group have an X-ray diffraction (crystallinity+orientation) much higher and of a different type compared to those containing monomeric units where keto carbonyl groups are absent.

The Applicant has surprisingly found that omega polyamides and copolyamides containing up to 3% of monomeric units having the structure (I) show a dramatic increase in the X-ray diffraction intensity compared to the polyamides as such, as well as to the polyamides wherein $m+n \leq 12$.

Such increase in X-ray diffraction involves a considerable improvement of the processability of the corresponding film (extrusion—critical dependent on the temperature), an easier orientation and, consequently, increased mechanical properties in applications, such as bags and food wrappers.

Other features and advantages of the invention will become more evident from the description of a preferred embodiment, but not limited thereto, illustrated in the following examples; wherein examples 1, 2a, 3a, 4a and 5a are comparison examples and are not part of this invention, while the examples 2 to 5 are according to the present invention. In all examples, nylon 6 is obtained under the same conditions of polymerization; in particular the polymerization is carried out for 10 hours, at 265° C. in a slight nitrogen flow. By parts (p) they are meant parts by weight.

EXAMPLE 1

(Comparison Example)

ε-aminocaproic acid is used: when it is processed under the aforesaid polymerization conditions, this acid produces nylon-6 having the following characteristics:
Melting point=223.4° C.
Crystallization=187.3° C.
ABS 290 nm=0 in 1% TFE (trifluoroethanol) solution As it can be observed in this comparison example, the absorption equal to zero proves that the product is extremely stable to the exposure to sunlight, and in particular to the exposure to U.V. radiation.

EXAMPLE 2

Under the aforesaid polymerization conditions 24.4 p. of ε-aminocaproic acid, 0.125 p. of 8-ketononadecanedioic acid and 0.45 p. of hexamethylenediamine are used. As it can be observed in this example, the structural units of the compound of the formula (I) are present in 0.5% by weight of the total weight of the polymer.

A polyamide is obtained, that has the following characteristics: Melting point=220.3° C. Crystallization=185.0° C. ABS 290 nm=0.20 in TFE 1% solution In this example a considerable increase in the U.V. absorption can be noticed.

EXAMPLE 2a (Comparison Example)

Under the polymerization conditions mentioned in the example 1, 24.4 p. of ε-aminocaproic acid, 0.125 p. of 6-keto-hendecanedioic acid and 0.070 p. of hexamethylenediamine are used. As it can be observed in this example, the monomeric units deriving from the 6-ketohendecanedioic acid are present in 0.5% by weight of the total weight of the polymer.

A polyamide is obtained, that has the following characteristics:
Melting point=221.5° C.
Crystallization=183.4° C.
ABS 290 nm=0.15 in 1% TFE solution In this example, even if some U.V. absorption can be noticed, this is considerably lower than that obtained in the example 2.

EXAMPLE 3

Under the aforesaid polymerization conditions 24.625 p. of ε-aminocaproic acid, 0.250 p. of 8-ketononadecanedioic acid and 0.090 p. of hexamethylenediamine are used. In this example the structural units of the compound having the structure (I) are present in 1% of the total weight of the polymer. Nylon −6 is obtained, that has the following characteristics:
Melting point=220.1° C.
Crystallization=184.8° C.
ABS 290 nm=0.40 in 1% TFE solution While keeping the melting point and crystallization values almost unchanged (which reflect the mechanical properties of the non-photodegraded polymer), an extremely high U.V. light absorption is obtained.

EXAMPLE 3a (Comparison Example)

Under the aforesaid polymerization conditions, 24.625 p. of ε-aminocaproic acid, 0.250 p. of 6-ketohendecanedioic acid and 0.140 p. of hexamethylene-diamine are used. In this example the monomeric units deriving from the 6-ketohendecanedioic acid are present in 1% by weight of the total weight of the polymer.

Nylon-6 is obtained, that has the following characteristics:
Melting point=221.4° C.
Crystallization=183.2° C.
ABS 290 nm=0.28 in 1% TFE solution A much lower U.V. light absorption is obtained in comparison with the one obtained in the example 3.

EXAMPLE 4

Under the aforesaid polymerization conditions, 24.2 p. of ε-aminocaproic acid, 0.5 p. of 8-ketononadecanedioic acid and 0.18 p. of hexamethylenediamine are used.

In this example the structural units of the compound having the structure (I) are present in 2% by weight of the total weight of the polymer.

Nylon-6 is obtained, that has the following characteristics:
Melting point=218.3° C.
Crystallization=179.2° C.
ABS 290 nm=0.9 in 1% TFE solution In this example, even with a slight decrease in the melting point and crystallization values, an extremely high U.V. light absorption is obtained.

EXAMPLE 4a (Comparison Example)

Under the aforesaid polymerization conditions, 24.2 p. of ε-aminocaproic acid, 0.5 p. of 6-ketohendecaanedioic acid and 0.28 p. of hexamethylenediamine are used. In this example the monomeric units deriving from the 6-keto hendecanedioic acid are present in 2% by weight of the total weight of the polymer.

Nylon-6 is obtained, that has the following characteristics:
Melting point =217.2° C.
Crystallization=176.2° C.
ABS 290 nm=0.5 in 1% TFE solution A lower U.V. light absorption is obtained in comparison with the one obtained in the example 4.

EXAMPLE 5

Under the aforesaid polymerization conditions, 23.850 p of ε-aminocaproic acid, 0.75 p. of 8-ketononadecanedioic acid and 0.27 p. of hexamethylenediamine are used. In this case the structural units of the compound having the structure (I) are present in 3.0% by weight of the total weight of the polymer.

Nylon-6 is obtained, that has the following characteristics:
Melting point=215.2° C.
Crystallization=178.2° C.
ABS 290 nm=1.5 in 1% TFE solution Compared to the foregoing examples 2 to 4, here the highest U.V. absorption is obtained.

EXAMPLE 5a (Comparison Example)

Under the aforesaid polymerization conditions, 23.850 p. of ε-aminocaproic acid, 0.75 p. of 6-ketohendecanedioic acid and 0.420 p. of hexamethylene-diamine are used.

In this case the monomeric units deriving from the 6-keto hendecanedioic acid are present in a 3.0% by weight of the total weight of the polymer.

Nylon-6 is obtained that has the following characteristics:
Melting point=214.1° C.
Crystallization=175° C.
ABS 290 nm=0.8 in 1% TFE solution Also in this case, U.V. absorption is lower than the one obtained in the example 5.

With reference to the above-mentioned examples, other data are given in the following table, with particular reference to the results of photodegradation due to exposure to U.V. light made on 30 micron thick oriented films obtained from the polyamides prepared in the above given examples. In particular, the U.V. radiation was produced according to a xenotest procedure corresponding to the ASTM G 26-84 standard.

The lamp was kept continuously on for 12 days and samples were made at the initial zero time, on the sixth day and on the twelfth day.

The relative viscosity related to the samples on the day zero, on the sixth day and on the twelfth day, was measured in a 1% solution in 96.5% sulfuric acid.

The —NH2 and —COOH end groups were titrated with a potentiometer in trifluoroethanolic solution of the polymer.

As it can be observed, the relative viscosity remains almost unchanged as days pass, when considering the comparison example 1: this means that the mechanical properties, represented by the relative viscosity, remain almost unchanged in nylon 6, after 12 days of exposure to the radiation. In the comparison examples 2a, 3a, 4a and 5a, even if some decrease in viscosity is obtained, this is relatively much lower than the one obtained in the corresponding examples 2, 3, 4 and 5 according to the invention. The example 2 according to the invention shows that even with 0.5 % of structural units (I) present in the polymer, a dramatic decrease in relative viscosity is obtained in 12 days. This means that the mechanical properties of nylon-6, containing the structural units having the structure (I), are rapidly destroyed by the U.V. radiation; in fact, in the example 2 the viscosity already decreases from 3.02 to 1.81 in 12 days.

Furthermore, the examples 3, 4 and 5 according to the invention clearly show that as the percentage of the structural units (I) present in the polymer increases, the reduction of the viscosity and, consequently, of the mechanical properties, as a result of the exposure to U.V. radiation, is even greater.

Therefore, it results that all the objects of the invention are achieve, since the reduction of the mechanical properties (as it results from the viscosity decrease shown in the enclosed table), produces such a photodegradation of nylon, that is enough to avoid the permanence of the product in the environment.

As far as the —NH2 and —COOH end groups are concerned, the table shows that in practice they are steady, when in the polymer the concentration of structural units of the compound (I) increases and when the photodegradation effect due to the exposure to U.V. light increases. This means that the photodegradation actually takes place as a result of the break of the polymer inner chain and not as a result of hydrolysis. As a matter of fact, if the decrease in viscosity was caused by hydrolysis, the end groups would have considerably increased. In our case, the almost steadiness of end groups, confirms the efficacy of the photodegradation according to the invention.

In practice it has been verified that the photodegraded polymer according to the invention can be easily attacked by bacteria who complete its degradation biologically.

TABLE

|       | Days of Exposure | Relative viscosity | —NH2  | —COOH |
|-------|------------------|--------------------|-------|-------|
| EX 1  | 0                | 2.93               | 48    | 50    |
| EX 1  | 6                | 2.65               | 39.6  | 47.09 |
| EX 1  | 12               | 2.44               | 41.24 | 50.27 |
| EX 2  | 0                | 2.89               | 38.2  | 39.1  |
| EX 2  | 6                | 2.85               | 33.4  | 50.3  |

TABLE-continued

| | Days of Exposure | Relative viscosity | —NH2 | —COOH |
|---|---|---|---|---|
| EX 2 | 12 | 1.82 | 43.5 | 58 |
| EX 2a | 0 | 3.02 | 37.7 | 50.5 |
| EX 2a | 6 | 2.40 | 37.7 | 44.03 |
| EX 2a | 12 | 1.81 | 48.65 | 63.56 |
| EX 3 | 0 | 3,.1 | 38.2 | 55.6 |
| EX 3 | 6 | 2.26 | 38.8 | 62 |
| EX 3 | 12 | 1.71 | 41 | 64.5 |
| EX 3a | 0 | 2.92 | 38.2 | 46.1 |
| EX 3a | 6 | 2.30 | 34.5 | 50.8 |
| EX 3a | 12 | 1.85 | 42.15 | 56.3 |
| EX 4 | 0 | 3.01 | 39.9 | 57 |
| EX 4 | 6 | 2.14 | 41 | 63.2 |
| EX 4 | 12 | 1.65 | 42.1 | 65.7 |
| EX 4a | 0 | 3.05 | 39.4 | 56.2 |
| EX 4a | 6 | 2.12 | 39.1 | 61.08 |
| EX 4a | 12 | 1.76 | 40.9 | 64.1 |
| EX 5 | 0 | 2.00 | 39.2 | 58.1 |
| EX 5 | 6 | 1.95 | 38.4 | 62.2 |
| EX 5 | 12 | 1.56 | 41.1 | 66.8 |
| EX 5a | 0 | 3.05 | 41.3 | 60.9 |
| EX 5a | 6 | 2.04 | 36.2 | 66.1 |
| EX 5a | 12 | 1.66 | 43.8 | 69.4 |

We claim:

1. Biodegradable polyamide characterized in that is contains keto carbonyl groups set out along the main polymer chain, in monomeric units having the structure (I)

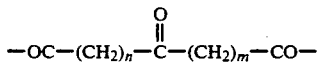

wherein n and m are equal or different whole numbers ranging from 8 to 10, said keto carbonyl groups being enough to cause an accelerated photodegradation of the polyamide, so to produce, after exposure to sunlight, a fragile or friable and biodegradable product, while keeping high mechanical properties before said exposure to sunlight.

2. Polyamide according to claim 1, characterized in that m and n are equal to 8.

3. Polyamide according to any of the claims 1 and/or 2, characterized in that it contains the monomeric units of formula (I) in an amount from 0.2 to 10 weight percent based on the total weight of the polymer.

4. Polyamide according to claim 3, characterized in that it contains the monomeric units of formula (I) in an amount from 0.5 to 3 percent by weight based on the total weight of the polymer.

5. Polyamide according to claim 1, in which said polyamide is nylon-6.6.

6. Polyamide according to claim 1, in which said polyamide is nylon-6.

7. Process for the preparation of a polyamide characterized in that it comprises the polymerization of hexamethylenediamine with adipic acid and with at least one dicarboxylic acid having the structure (III)

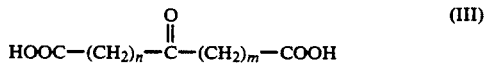

where n and m are equal or different whole number ranging from 8 to 10.

8. Process for the preparation of a polyamide according to claim 7, characterized in that it includes the polymerization of caprolactam and/or ε-aminocaproic acid with at least one dicarboxylic acid having the structure (III)

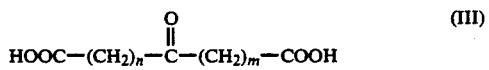

and with hexamethylenediamine in equal molar amount compared to said dicarboxylic acid having the structure (III).

9. Mono-oriented film characterized in that it is obtained from a polyamide as claimed in claim 1.

10. Bioriented film characterized in that it is obtained from a polyamide as claimed in claim 1.

11. Manufactured articles characterized in that they are obtained from a polyamide according to claim 1.

12. Polyamide according to claim 4, in which said polyamide is nylon-6.6.

13. Polyamide according to claim 4, in which said polyamide is nylon-6.

14. Process for the preparation of a polyamide characterized in that it comprises the polymerization of a hexamethylenediamine with adipic acid and with at least one dicarboxylic acid having the structure (III)

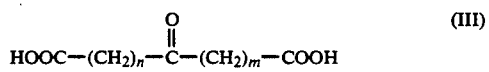

where n and m are equal or different whole numbers ranging from 8 to 10.

15. Process for the preparation of a polyamide according to claim 14, characterized in that it includes the polymerization of caprolactam and/or aminocaproic acid with at least one dicarboxylic acid havind the structure (III)

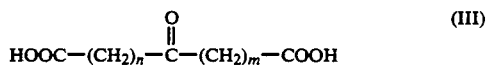

and with hexamethylenediamine in equal molar amount compared to said dicarboxylic acid having structure (III).

16. Mono-oriented film characterized in that it is obtained from a polyamide as claimed in claim 4.

17. Bioriented film characterized in that it is obtained from a polyamide as claimed in claim 4.

18. Manufactured articles characterized in that they are obtained from a polyamide according to claim 4.

* * * * *